(12) United States Patent
Takano et al.

(10) Patent No.: US 6,741,939 B2
(45) Date of Patent: May 25, 2004

(54) CALCULATION METHOD OF DISCHARGE AND TRANSFER AMOUNT OF CHEMICAL SUBSTANCES AND SERVER AND SYSTEM THEREFOR

(75) Inventors: Masatoshi Takano, Okazaki (JP); Masahiro Higuchi, Toyota (JP); Takuro Kodama, Okazaki (JP); Kenji Narikiyo, Munakata (JP); Eiji Ishida, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 207 days.

(21) Appl. No.: 09/833,579

(22) Filed: Apr. 13, 2001

(65) Prior Publication Data

US 2002/0016685 A1 Feb. 7, 2002

(30) Foreign Application Priority Data

Apr. 14, 2000 (JP) ........................ 2000-114271
Mar. 29, 2001 (JP) ........................ 2001-096960

(51) Int. Cl.$^7$ .............................................. G06F 17/60
(52) U.S. Cl. ............................. 702/31; 702/22; 702/27; 702/30; 702/186; 702/187; 702/189; 702/194
(58) Field of Search ................. 702/22–27, 30, 702/31, 186, 187, 189, 194, 196, FOR 138, FOR 155, FOR 134–FOR 140; 705/28, 29; 700/213, 214, 217–219, 121; 376/216, 245, 249; 52/900; 340/500, 501, 915; 422/102, 186.03, 186.04, 232, 233; 707/100, 101, 102, 104.1, 280

(56) References Cited

U.S. PATENT DOCUMENTS 5,726,884 A * 3/1998 Sturgeon et al. ............. 705/9
5,812,421 A * 9/1998 Fujii et al. ..................... 702/45
5,983,225 A * 11/1999 Anfindsen ....................... 707/8
6,067,549 A * 5/2000 Smalley et al. ........... 707/104.1
2001/0025282 A1 * 9/2001 Ohishi et al. ............. 707/104.1
2002/0004768 A1 * 1/2002 Sekine et al. .................. 705/28

(List continued on next page.)

FOREIGN PATENT DOCUMENTS

| GB | 2095829 A | * 10/1982 | .......... G01N/35/02 |
|---|---|---|---|
| JP | 8-178832 A | 7/1996 | |
| JP | 11-219391 A | 8/1999 | |
| JP | 11-290832 A | 10/1999 | |
| JP | 2000-29880 A | 1/2000 | |
| JP | 2000-29900 A | 1/2000 | |
| JP | 2000029900 A | * 1/2000 | .......... G06F/17/30 |
| JP | 2000137747 A | * 5/2000 | .......... G06F/17/60 |

*Primary Examiner*—Marc S. Hoff
*Assistant Examiner*—Carol S Tsai
(74) *Attorney, Agent, or Firm*—Oliff & Berridge, PLC

(57) ABSTRACT

Data indicating a material, a use step of the material and a use amount of the material which are transmitted from a client terminal through a network are inputted and stored; a chemical substance contained and a content thereof are searched by searching for a database of material components which stores the contained chemical substance and the content thereof corresponding to the material by using the inputted material as a key; the database of a material balance coefficient which stores a ratio in which the chemical substance is discharged and transferred by every separate whereabouts is searched corresponding to the chemical substance and the use step of the material by using the searched chemical substance and the inputted use step of the material as a key; the discharge and transfer amount of the chemical substances by every separate whereabouts is calculated based on the searched discharge and transfer amount, the inputted use amount of the material and the searched content; and the calculated discharge and transfer amount of the chemical substances by every separate whereabouts is transmitted to the client terminal through the network.

13 Claims, 10 Drawing Sheets

U.S. PATENT DOCUMENTS

| | | | |
|---|---|---|---|
| 2002/0004769 A1 * | 1/2002 | Ichikawa et al. | 705/29 |
| 2002/0026339 A1 * | 2/2002 | Frankland et al. | 705/7 |
| 2002/0052666 A1 * | 5/2002 | Fukatsu et al. | 700/107 |
| 2002/0056638 A1 * | 5/2002 | Ohishi et al. | 204/401 |
| 2002/0069089 A1 * | 6/2002 | Larkin et al. | 705/4 |
| 2002/0099587 A1 * | 7/2002 | Kakihana et al. | 705/7 |
| 2002/0133302 A1 * | 9/2002 | Matsui et al. | 702/30 |
| 2003/0004965 A1 * | 1/2003 | Farmer et al. | 707/104.1 |
| 2003/0023340 A1 * | 1/2003 | Kitamoto et al. | 700/121 |

* cited by examiner

MATERIAL COMPONENT D/B

FIG. 4

MATERIAL BALANCE COEFFICIENT D/B  20

| MATERIAL CATE-GORY | NAME OF MATE-RIAL | NAME OF SUBS-TANCE | STEP | | | | | | BODY COATING | | | |
|---|---|---|---|---|---|---|---|---|---|---|---|---|
| | | | PROCES-SING FACILITY | MAJOR CLASSIFICATION | INTERMEDIARY CLASSIFICATION | MINOR CLASSIFICATION | MAJOR CLASSIFICATION | MINOR CLASSIFICATION | COAT-ING | INTERMEDIATE COATING | OVER COATING | |
| | | | | | | | | | | | 1 | 2 |
| | | | | | | | | | | | REMOVAL A | REMOVAL B |
| | | | | | | | | | | | EFFICIE-NCY M-NCY N | EFFICIE-NCY M-NCY N |
| COATING | A | P | | | | | | | | | Q1.1 | P1.2 Q1.2 | Q1.3 |
| | | Q | | | | | | | | | | P2.2 | |
| | B | P | | | | | | | | | | | |
| | | R | | | | | | | | | | | |

Q1.2

| TO AIR | TO WATER BASIN | TO RECLAMATION | TO PRODUCT | DECISION ORGANIZATION |
|---|---|---|---|---|
| q1 | q2 | q3 | q4 | K1 |

CALCULATION METHOD OF DISCHARGE AND TRANSFER AMOUNT OF CHEMICAL SUBSTANCES AND SERVER AND SYSTEM THEREFOR

INCORPORATION BY REFERENCE

The disclosures of Japanese Patent Application Nos. 2000-114271 filed on Apr. 14, 2000 and 2001-096960 filed on Mar. 29, 2001, including the specifications, drawings and abstracts are incorporated herein by reference in their entirety.

BACKGROUND OF THE INVENTION

1. Field of the Invention

The present invention relates to a technology so that those who carry out a business using a material containing chemical substances can easily calculate the discharge and transfer amount of the chemical substances.

2. Description of the Related Art

Many people proceed business activity using various materials which contain chemical substances. For example, those who engage in the production of automobiles use a coating in the production process of the automobiles. Chemical substances such as toluene, xylene, and the like are contained in the coating. Those who engage in the cleaning business use various cleansers. Various chemical substances are also contained in various cleansers. Materials containing the chemical substances which are used for a business are discharged in air, water basin and the like. Some of the chemical substances are supplied to the market as products such as an automobile and the like.

In order to grasp where and what kind of the chemical substances were discharged and transferred by every delivery separate whereabouts of the chemical substances such as products, air, water basin and the like, those who use materials containing the chemical substances must investigate many matters. Firstly, they must know what kind of chemical substances are contained and how much they are contained in the materials which they use. Secondly, they must know at what ratio the chemical substances are discharged and transferred by every separate whereabouts of the chemical substances such as products, air, water basin and the like, according to a use method and a discharge method carried out by themselves. For example, even in the same washing liquids, the discharge rate by every separate whereabouts such as air or water basin differs depending on a case of washing work pieces by soaking them or a case of washing work pieces by blowing them. In addition, even if the components of the washed and contaminated wash liquids are identical, the discharge and transfer rate by every separate whereabouts differs depending on the subsequent water discharging method.

Rigorous man power is required to really carry out the above-mentioned tasks. Even at a first stage, they must investigate a list of the chemical substances and contents by every chemical substance by inquiring them to the supplier of the materials. Further, the data are often changed by the circumstances of the supplier of the materials. At a second stage, it is more troublesome, the calculation of the discharge and transfer amount by every separate whereabouts is sometimes difficult, and a big scale experiment is required in some cases.

In order to reduce the load of labors required for the first stage, a technology described in Japanese Patent Application Laid-open No. 2000-29900 is proposed. In this technology, a plurality of business corporations cooperate each other and propose a technology for making the list of the chemical substances contained in the materials and the contents of the respective materials a database, by noticing that there is a sequence that one complex material is made by combination of a plurality of materials, and a high dimensional materials is made by combination of the complex materials with other materials.

FIG. 1 exemplifies a case that a material D is prepared from a material A and a material B, and a material E is made from a material C and a material D. In this technology, the business corporations related to the sequence of the materials complete a common database of components in cooperation with each other. The database of components 2 are constructed in a server, a group of the suppliers of materials utilizes a network 4 such as an internet or the like, complete the database 2 in cooperation with each other, and utilizes it in cooperation with each other.

Firstly, the supplier of the material A registers in the database 2 that a chemical substance P is contained by a% in the material A that he supplies. Simultaneously, the supplier of the material B registers in the database 2 that the chemical substance P is contained by b% in the material B which he supplies. Those producing the material D using the material A and the material B access the database 2, so that they can know the content of the chemical substance P in the material A and the material B which they use as a raw material. Accordingly, the supplier of the material D can calculate the content of the chemical substance P in the material D which he supplies and the content ratio from the above-mentioned data, and registers it in the database of components 2.

The database of components related to many materials can be prepared speedy while suppressing the load of the respective business corporations to lower level, by applying the above-mentioned technology to a series of sequences of the materials.

Although the above-mentioned technology is a very good technology of providing speedy the database of components of the chemical substances contained in materials while suppressing the load to lower level, the discharge and transfer amount of the chemical substances by every delivery separate whereabouts cannot be calculated only by the technology.

For example, the discharge and transfer amount calculated by every separate whereabouts such an air, water basin and the like differs quite between a case that a metal material is immersed in the material A containing a% of the chemical substance P and the material A is coated on the metal material, and a case that the material A is coated on the metal material by spraying. The discharge and transfer amount by every separate whereabouts differs depending on a case of primarily processing and comprehensively water discharging washing liquid A containing a% of a chemical substance P or a case of comprehensively water discharging without primary processing. Of course, the discharge and transfer amount by every separate whereabouts differs depending on a case of incinerating sludge produced by water discharge processing or a case of land fill.

Accordingly, even if it can be known, for example, that a g of the chemical substance P is contained in 100 g of the material A from the fore-mentioned database, the discharge and transfer amount of the chemical substance P by every separate whereabouts cannot be calculated only by the data.

SUMMARY OF THE INVENTION

An object of the present invention is to provide a technology capable of calculating the discharge and transfer amount of chemical substances by every separate whereabouts, by developing the fore-mentioned conventional database of components which is commonly utilized.

In a first embodiment of the present invention, a calculation method of the discharge and transfer amount of chemical substances by every separate whereabouts is equipped with (1) a step of inputting and storing a data which indicates a material, a use step of the material and a use amount of the material which are transmitted from a client terminal through a network;

(2) a step of searching for a database of material components storing the contained chemical substance and content thereof corresponding to the material by using the inputted material as a key, and searching for the chemical substance contained in the material and the content;

(3) a step of searching for the database of a material balance coefficient which stores a ratio in which the chemical substance is discharged and transferred by every separate whereabouts of the chemical substance such as air, water basin, a product and the like corresponding to the chemical substance and the use step of the material by using the searched chemical substance and the inputted use step of the material as a key, and searching for the discharge and transfer ratio by every separate whereabouts when the searched chemical substance is used in the inputted use step of the material;

(4) a step of calculating the discharge and transfer amount of the chemical substances by every separate whereabouts based on the searched discharge and transfer ratio, the inputted use amount of the material, and the searched contents; and (5) a step of transmitting the calculated discharge and transfer amount by very separate whereabouts when the searched chemical substance to a client terminal through a network.

Wherein it is important that the database of a material balance coefficient used in (3) is prepared and the database is utilized.

As described above, the discharge and transfer amount of chemical substances by every separate whereabouts changes wholly according to the method of using the materials. However, there are various methods of using the materials, and every business corporation uses its own proprietary use method. Accordingly, when the respective business corporations prepare the database in cooperation with each other, it remains at providing database with a high multiusability of components and utilizing it in cooperation, and a calculation equation of the discharge and transfer amount by every separate whereabouts must be completed according to its own proprietary use method of the business corporation, beyond it.

However, the present inventor studied intensively, and as a result, found that when a category of a material and the material are specified, the method of using the material is unexpectedly limited, and number which realistically one can input selectively is actually spotted. On the other hand, when a ratio in which chemical substances are discharged and transferred is determined by every separate whereabouts of chemical substances to air, water basin, a product and the like corresponding to the chemical substances and the use steps of materials, it was confirmed that a comparatively accurate ratio can be bestowed by every classification even if a use method is classified by the number that one can select realistically.

Making the best use of the information, it was found that the present invention constructs a database of a material balance coefficient which stores a ratio in which the chemical substances are discharged and transferred by every separate whereabouts to air, water basin, a product and the like corresponding to the chemical substances and the use steps of the materials, and utilizes it in cooperation with each other. Thus the user of the material was designed to be able to calculate the discharge and transfer amount of chemical substances which contained in the material, by every separate whereabouts.

According to the above-mentioned embodiment, the user of the material can obtain the calculation result of the discharge and transfer amount of chemical substances which contained in the material, by every separate whereabouts by only inputting the material used, the step of using the material, and the use amount of the material from the client terminal. Further, the user of the material can calculate using the discharge and transfer ratio which is very close to the real discharge and transfer ratio by every separate whereabouts in the use step which he uses, and a reliable discharge and transfer amount is calculated.

In the above-mentioned embodiment, the calculation process of the discharge and transfer amount whose calculation method should be naturally established at every place of business, can be systematically treated, and a plurality of places of business are designed to be able to utilize the calculation process in cooperation with each other.

Some materials are discharged and transferred without any special processing after use or other materials are processed and discharged after use. For example, the coating adhered to products shipped after coated moves from industrialists without special processing after use. In this case, there is no need to consider the discharge step in calculating the discharge and transfer rate by every separate whereabouts. However, in the case where the materials are processed and discharged after use, the discharge and transfer amount by every separate whereabouts cannot be calculated without considering the discharge step.

A calculation method in a second embodiment of the present invention has been developed.

This calculation method comprises:

(1a) a step of inputting and storing data indicating materials, the material use step, the material use amount, and the discharge step which are transmitted from a client terminal through a network;

(2a) a step of searching a material component database that stores contained chemical substances and contents in association with the substance by defining the inputted material as a key, and then, searching the chemical substances contained in the material and contents;

(3a) a step of searching a material balance coefficient database that stores a rate of which chemical substances are discharged and transferred by every separate whereabouts of the chemical substances such as air, water basin, a product and the like in association with the chemical substances, material use step, and discharge step by defining as a key the searched chemical substances, inputted material use step, and discharge step, and then, searching a discharge and transfer rate by every separate whereabouts when the searched chemical substances are discharged at the discharge step used and inputted at the inputted material use step;

(4a) a step of calculating the discharge and transfer amount by every separate whereabouts of chemical substances based on the searched discharge and transfer rate, inputted material use amount, and searched contents; and (5a) a step of transferring the discharge and transfer amount by every separate whereabouts of the calculated chemical substances to the client terminal through a network.

Even a variety of discharge Steps that seem to exist infinitely can be systematically and hierarchically classified by the Inventor research. When this classification system is employed, it was verified that a variety of discharge steps can be classified by the number to an extent such that one can select it realistically. Moreover, it was verified that the discharge and transfer rate by classification can be approximated to a practically usable extent by being classified by the number of such extents.

According to this method, the discharge and transfer amount by every separate whereabouts can be calculated in consideration of the discharge step.

It is preferable that the above calculation be executed without man power. Thus, of the steps, at (1a), data indicating the materials, the material use step, the material use amount, and the discharge step which are transmitted from the client terminal through a network is inputted to a server, and is stored therein. The steps of (2a) to (5a) are executed by the server.

In this case, the client can execute the above calculation online. This online calculation may not be executable in all cases, and is valid even in the case where the calculation is possible only under special conditions.

In another point of view, the method of the present invention in directed to a method of calculating the discharge and transfer amount of chemical substances for the client by executing:

(6) a stage of displaying a material list classified by material categories to the client terminal, and then, prompting the client to input the use material and material use amount;

(7) a stage of displaying a hierarchically classified material use step list on the client terminal, and then, prompting the client to input the material use step;

(8) a stage of displaying a hierarchically classified discharge step list on the client terminal, and then, prompting the client to input the discharge step; and (9) a stage of inputting to the server the use material, material use amount, and material use step, and discharge step inputted from the client terminal, calculating the discharge amount by very separate whereabouts of the chemical substances contained in the use material by the server, and then, outputting the amount to the client terminal.

Lists displayed on the client terminal may be all displayed at the same time or may be displayed in an interactive format while only the associated portion is extracted.

In this case, the client can input the materials, material use amount, material use step, and discharge step used by himself or herself while the client is supported by information displayed at the client terminal.

In this manner, data required for calculating the discharge and transfer amount by every separate whereabouts of chemical substances is inputted, and the server calculates discharge and transfer amount by every separate whereabouts of chemical substances based on the inputted data. The calculation result is outputted to the Client's server.

In this way, the client can calculate the discharge and transfer amount by chemical substances without investigating the material component composition or the discharge and transfer rate affected by the use step and discharge step.

In a second embodiment of the present invention, a server for calculating the discharge and transfer amount of chemical substances by every separate whereabouts has

(10) means for inputting and storing a data indicating a material, a use step of the material, and a use amount of the material;

(11) database of a material component storing the chemical substance contained and the content corresponding to the material;

(12) means for searching for the database of the material component using the inputted material as a key, and searching for the chemical substance and the content contained in the material;

(13) a database of a material balance coefficient which stores a ratio in which the chemical substance is discharged and transferred by every separate whereabouts of the chemical substance such as air, water basin, a product and the like corresponding to the chemical substance and the use step of the material;

(14) means for searching for the database of a material balance coefficient using the searched chemical substance and the inputted use step of the material as a key, and searching for the discharge and transfer ratio by every separate whereabouts when the searched chemical substance is used in the inputted use step of the material,

(15) means for calculating the discharge and transfer amount of the chemical substances by every separate whereabouts based on the searched discharge and transfer ratio, the inputted use amount of the material and the searched content; and

(16) means for outputting the calculated discharge and transfer amount by every separate whereabouts of the chemical substances.

The above-mentioned server realizes an environment for carrying out the above-mentioned calculation method by connecting to a client terminal through the Network such as the internet and the like. Under the environment, a plurality of the places of business utilize the server in cooperation with each other, and can calculate the discharge and transfer amount of the chemical substances by every separate whereabouts at a short time and a little load.

In the case where the discharge and transfer amount by every separate whereabouts cannot be calculated without considering the discharge step, the following server is employed. This server comprises:

(10a) means for inputting and storing data indicating a material, a material use step, a material use amount, and a discharge step;

(11a) a material component database that stores contained chemical substances and contents in association with an inputted material;

(12a) means for searching the material component database by defining the inputted material as a key, and then, searching the chemical substances contained in the material and the contents;

(13a) a material balance coefficient database that stores a rate of which the chemical substances are discharged and transferred by every separate whereabouts of the chemical substances such as air, water basin, a product and the like in association with the chemical substances, material use step, and discharge step;

(14a) means for searching the material balance coefficient database by defining the searched chemical substances, inputted material use step, and discharge step as a key, and then, searching the discharge and transfer rate by every separate whereabouts when the searched chemical substances are discharged at the discharge step used and inputted at the inputted material use step;

(15a) means for calculating the discharge and transfer amount by every separate whereabouts of the chemical substances based on the searched discharge and transfer rate, inputted material use amount, and searched contents; and (16a) means for outputting the discharge and transfer amount by every separate whereabouts of the calculated chemical substances.

This server can calculate the discharge and transfer amount by every separate whereabouts of chemical substances in consideration of the discharge step.

The present invention also provides a computer system for calculating the discharge and transfer amount by every separate whereabouts of chemical substances. In this system, the client terminals are connected to a server for calculating the discharge and transfer amount of chemical substances through Internet or a network such as in-house computer network. In this system,

(17) the client terminal prompts the client to interactively input data-indicating materials, material use step, material use amount, and discharge step; and

(18) the server for calculating the discharge and transfer amount of chemical substances calculates the discharge and transfer amount by every separate whereabouts of chemical substances, and transmits the calculation result to the client terminal by employing the material component database that stores the contained chemical substances and contents in association with materials and a material balance coefficient database that stores a rate of which the chemical substances are discharged and transferred by every separate whereabouts of the chemical substances such as air, water basin, a product and the like in association with the chemical substances, material use step, and discharge step.

According to this computer system, the client can know on the spot, the discharge and transfer amount by every separate whereabouts of the chemical substances contained in materials used by himself or herself by answering questions in the interactive form.

In the above computer system, it is preferable that the material supplier server is connected to a network, and the material component database is updated based on data transmitted from the material supplier server.

In this case, the updating of the material component database in executed timely and smoothly.

Moreover, the material component database can be opened to a network. In this case, the material component database itself serves as product information or an "e"-market place on an "e"-commerce, and the expansion and rich contents of the material component database are accelerated. It is expected that the material component database is expanded in a self-increment manner.

In the above case, it is preferable that an operator of the server for calculating the discharge and transfer amount of chemical substances checks data transmitted from the material supplier server, and the material component database is updated based on the checked data.

By doing this, the reliability of the database can be guaranteed.

In the case where the material supplier server is connected to a network, the substance component database can store link information indicating an address having stored therein the component information on each material that exists in the material supplier server.

In this case, the material component database can be compressed, and moreover, the maintenance and management of the database can be simplified.

In the above computer system, it is preferable that the client terminals capable of browsing the material component database are restricted by material.

For example, there can be applied a restriction that the suppliers of materials X, Y, and Z can browse the material X without any limitation; the suppliers can browse chemical substances Y1 to Y3 with respect to the material Y, but only specified clients can browse any other substance; and only specific clients can browse all the information on contained chemical substances for the material Z.

Some materials include sales secret information n contained chemical substances and their contents. Ther exists information which can be disclosed to specific clients, but cannot be disclosed to any other client. For example, such information may be disclosed to the clients using the corresponding materials, but may not be disclosed to any person other than the user. Even if the above restriction is applied, the discharge and transfer amount by every separate whereabouts of the chemical substances contained in materials used by the clients can be calculated.

Required component data can be easily acquired by permitting the above restrictions. Thus, the system usage can be expanded.

It is preferable that the client terminal has a function for printing in a document format the discharge and transfer amount by every separate whereabouts of the chemical substances transmitted from the server for calculating the discharge and transfer amount of chemical substances.

Providing this function makes it possible to inform the necessary departments and sections of the discharge and transfer amount by every separate whereabouts of chemical substances.

It is more preferable that the client terminal has a function for printing in an intensive document format the discharge and transfer amount by every separate whereabouts of the chemical substances transmitted from the server for calculating the discharge and transfer amount of chemical substances.

The discharge and transfer amount by every separate whereabouts of chemical substances may require the discharge and transfer amount by finely classified destination depending on intended use or may require the discharge and transfer amount by roughly classified destination. A document according to intended use can be created by providing the above integrating function.

According to the above-mentioned second embodiment, the user of the material can obtain the calculation result of the discharge and transfer amount of chemical substances which contained in the material, by every separate whereabouts, by only inputting the material used, the use step of the material, and the use amount of the material (discharge step as required) from the client terminal. At this time, the user of the material can calculate the discharge and transfer amount using the discharge and transfer ratio which is very close to the real discharge and transfer ratio by every separate whereabouts in the use process which is used by the user (occasionally, use step and discharge step), and a reliable discharge and transfer amount is calculated at a short time and a little load.

Accordingly, the business man whose user ought to grasp the discharge and transfer amount by every separate whereabouts can exactly perform at a little load the duty imparted, such as the first kind assigned chemical substance which was assigned in the Act (PRTR Act) related to the acceleration of improving the grasp of the discharge amount of a specified chemical substance to environment and the management, and the like.

BRIEF DESCRIPTION OF THE DRAWINGS

FIG. 4 is a diagram schematically showing a storage content of a database of a material balance coefficient.

PIG. 8 is a diagram showing hierarchical classification 1 of the discharge step.

Figure 9:
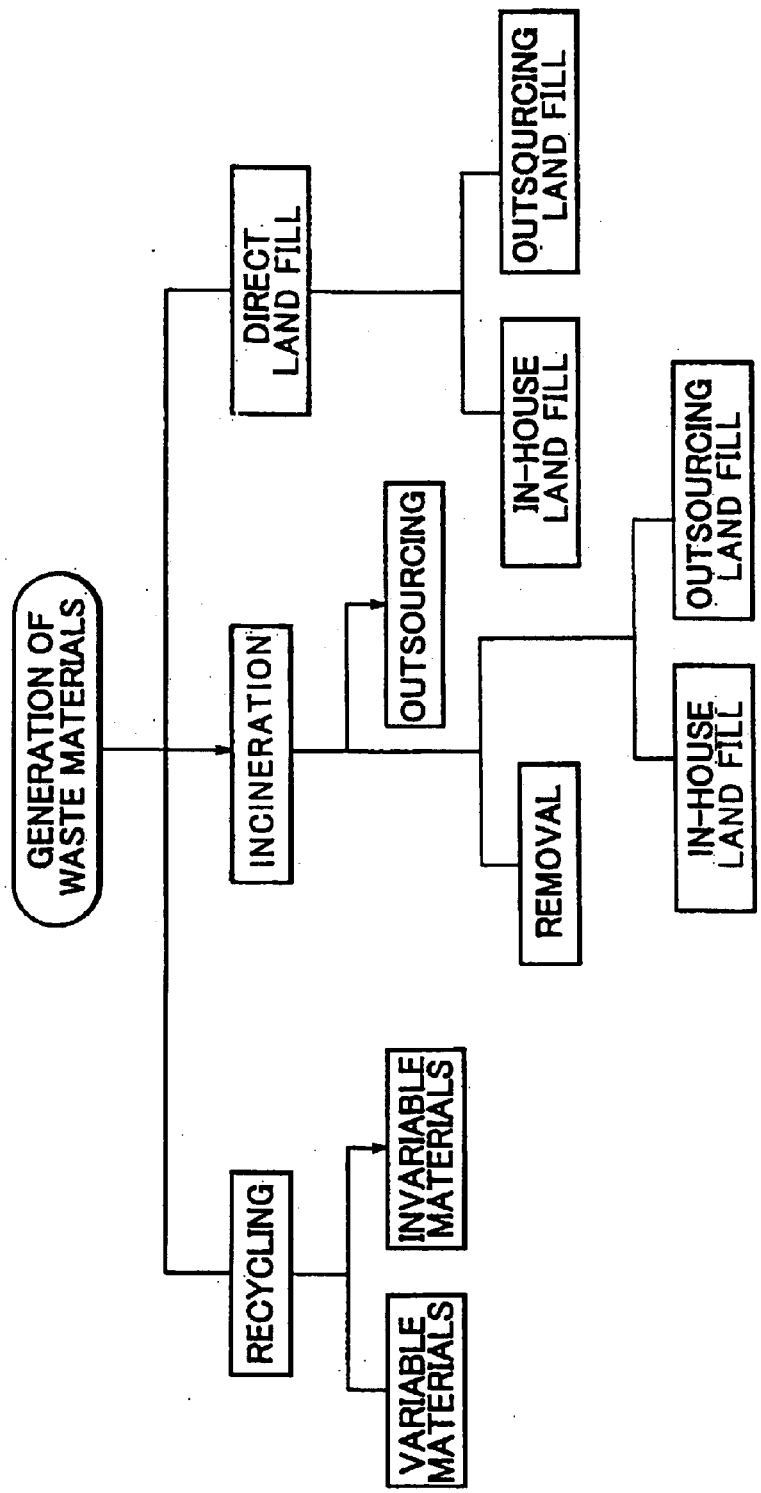

FIG. 9 is a diagram showing hierarchical classification 2 of the discharge step.

Figure 10:
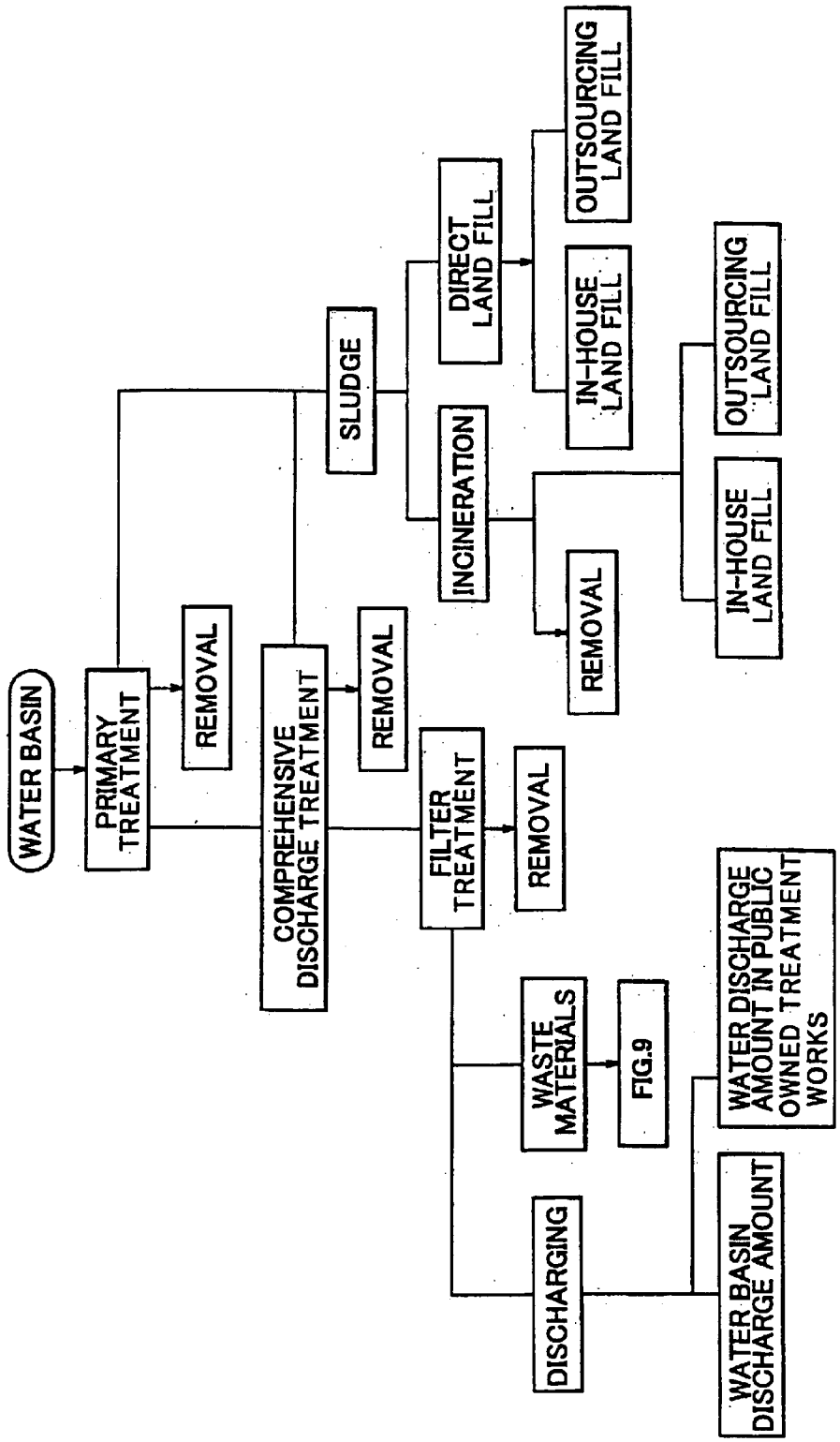

FIG. 10 is a diagram showing hierarchical classification 3 of the discharge step.

DETAILED DESCRIPTION OF THE PREFERRED EMBODIMENTS

The characteristics of embodiments illustrated will be described below.

(First Embodiment)

A server for calculating a discharge and transfer amount of chemical substances is connected with a terminal of a material supplier through a network, and the material supplier registers the data of the material which he supplies, in the database of material components which stores the chemical substances contained and the contents corresponding to the material.

Thus, the load required for the provision of the database of material components and the maintenance of the data is reduced. Further, each of the clients can calculate the discharge and transfer amount based on accurate data. Further, the material supplier is not required to send the data of components by every delivery. This is particularly important when the data of material components are changed.

(Second Embodiment)

In the first embodiment, the server for calculating the discharge and transfer amount of chemical substances records only the data which was electronically approved in the database. Thus, only the data which were transmitted from a real material supplier are stored in the database.

(Third Embodiment)

In the first embodiment, a practical user of the server for calculating the discharge and transfer amount of chemical substances monitors the storage contents of the database of material components, and finds abnormal data. Thus, the reliability of the database is improved.

(Fourth Embodiment)

In the first embodiment, the practical user of the server for calculating the discharge and transfer amount substances contained and contents thereof which are transmitted from the terminal of a material supplier, and registers only the data which are not abnormal in the database. The reliability of the database of material components is improved when the step is added.

(Fifth Embodiment)

In the first embodiment, indexes which indicate the reliability evaluated by the practical user of the server for calculating the discharge and transfer amount of chemical substances are stored in the database of material components by every material. According the embodiment, the practical user can know the reliability of the data of the discharge and transfer amount calculated.

(Sixth Embodiment)

The material balance coefficient database stores organizations that determine the associated rate. According to this embodiment, the material user can evaluate the reliability of the calculated discharge and transfer amount.

(Seventh Embodiment)

A component database concerning PRTR substances is released without any limitation with respect to chemical substances (PRTR substances) obliged to report the discharge and transfer amount in accordance with the PRTR law.

(Eighth Embodiment)

In the material component database, available chemical substance levels are designated according to the clients that utilize them. For example, a total contents of aromatic fatty acid is merely disclosed to specific organizations, and the breakdown is not available. In contrast, the breakdown of the contents by substances contained in the aromatic fatty acid. Only required data is disclosed to required persons, and the disclosure of unnecessary data can be avoided.

Figure 1:
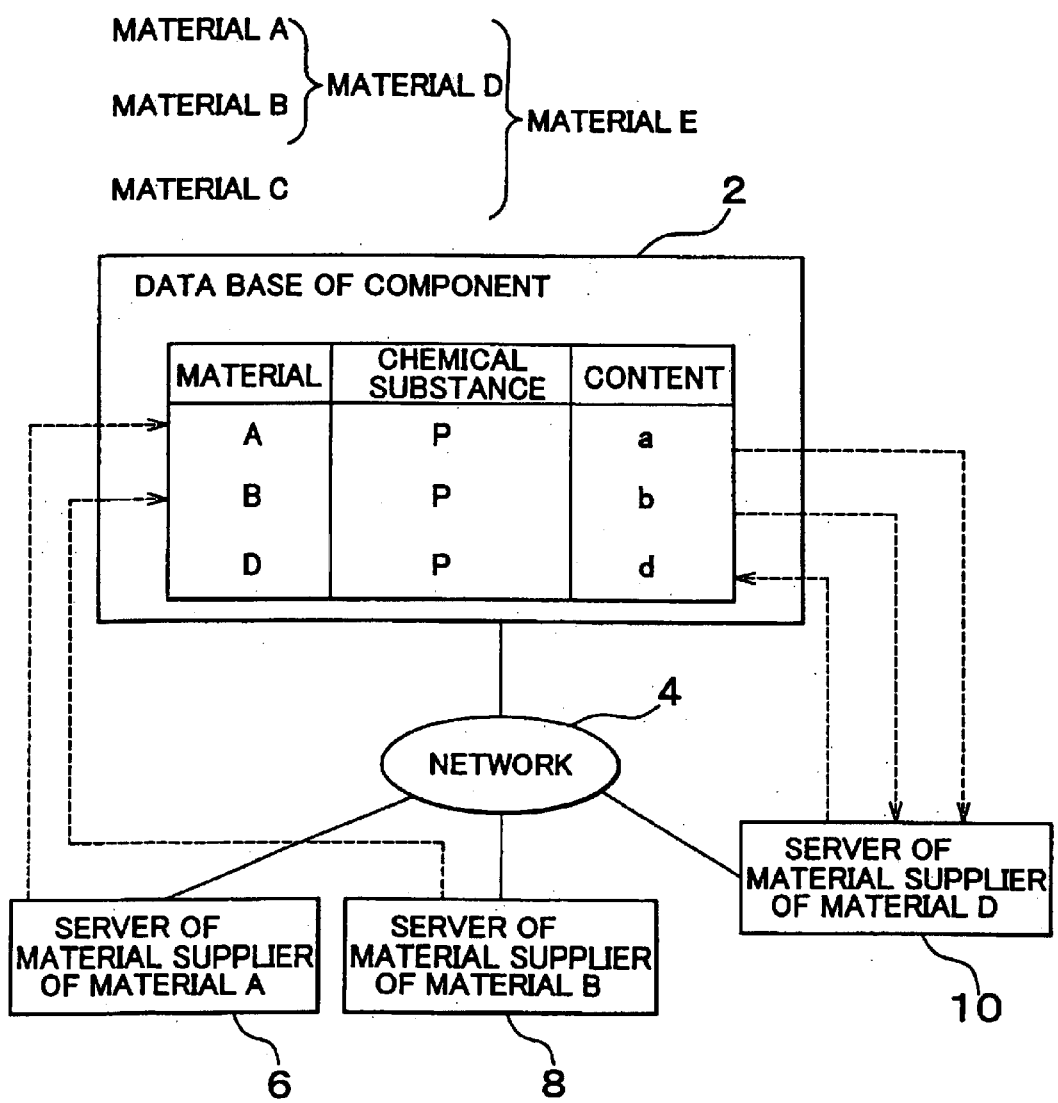
FIG. 1 is a diagram showing a process of providing a database of material components in cooperation with each other.
Figure 2:
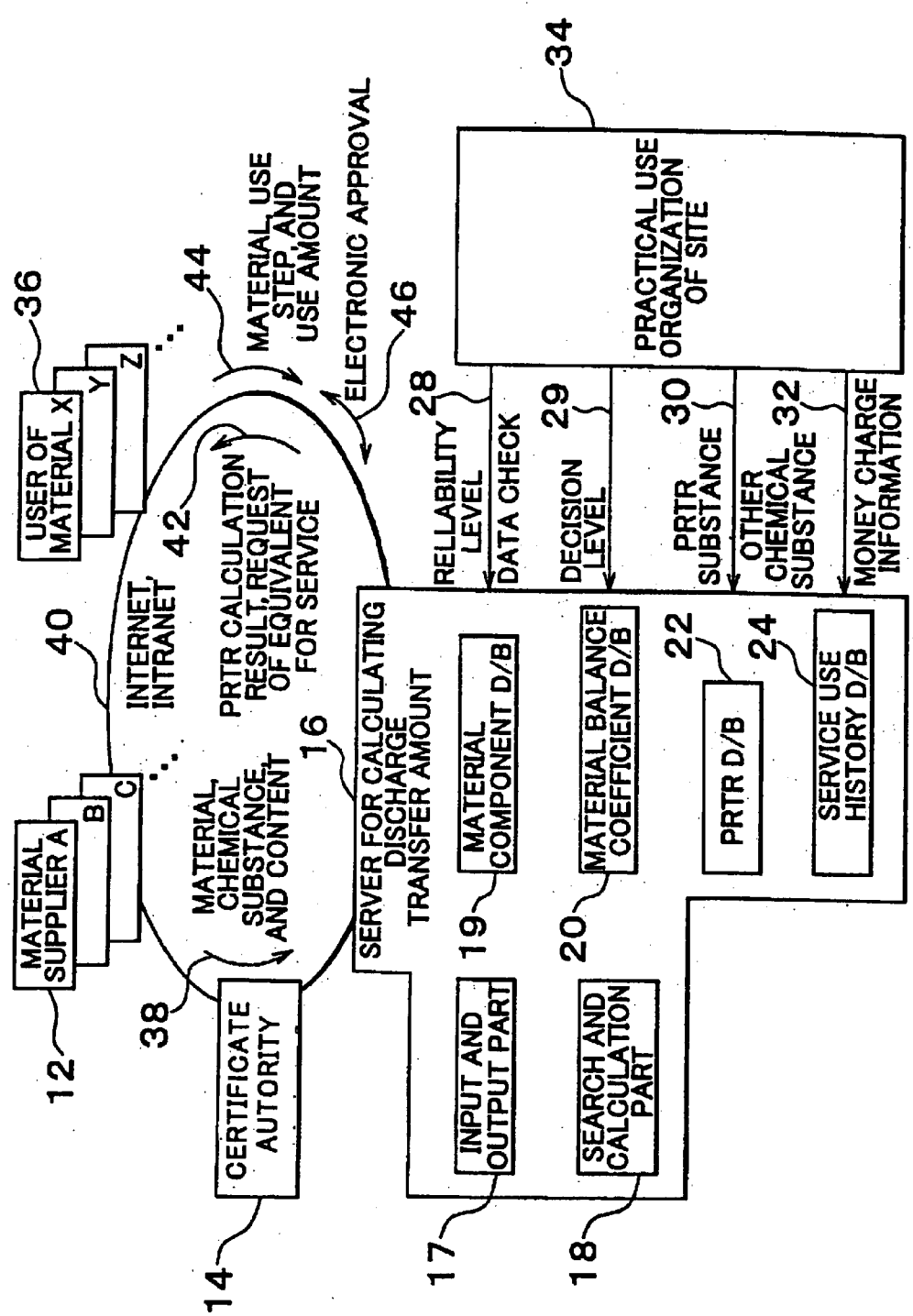
FIG. 2 is a constitutional diagram showing a calculation system of a discharge and transfer amount of chemical substances by every separate whereabouts in one embodiment of the present invention.

FIG. 2 shows one embodiment of a calculation system of the data of the discharge and transfer amount by every separate whereabouts of chemical substances which is a collaborate utilization system and performed the present invention.

A server for calculating the discharge and transfer amount of chemical substances 16 is connected with a server of a material supplier A, a server of a material supplier B, . . . 12, a terminal of the user of a material X (a client terminal), a terminal of the user of a material Y, . . . 36, and a certificate authority 14 through a network 40 such as an internet, an intranet and the like.

The server for calculating the discharge and transfer amount of chemical substances 16 is mainly composed of an input and output section 17, a search and calculation section 18, a database of material components 19, a database of a material balance coefficient 20, a PRTR database 22, and a database of a service use history 24.

As shown in the data flow of an arrow 38, the server of a material supplier 12 transmits the list of chemical substances contained in the material which he supplies and the contents of chemical substances together with the data showing the material, to the server for calculating the discharge and transfer amount of chemical substances 16 in a condition in which it is electronically approved by the certificate authority 14. After once the transmitted data is stored in the input and output section 17, it is stored in the database of material components 19.

Figure 3:
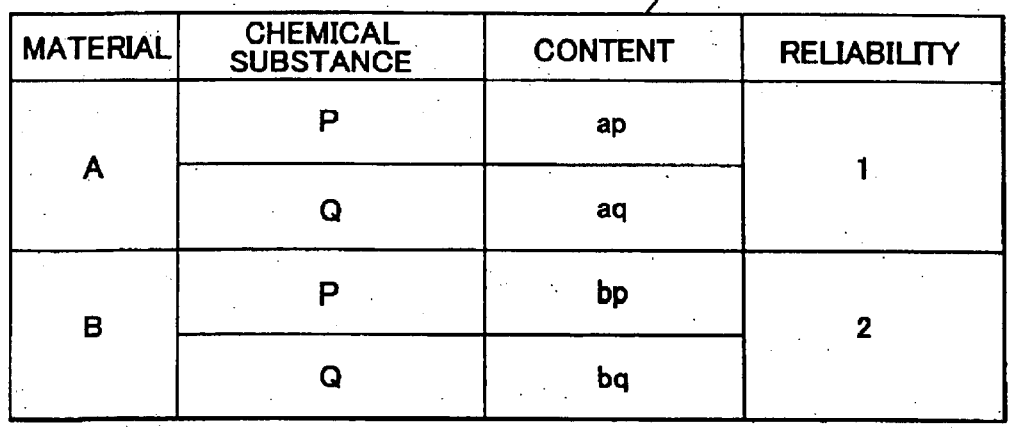
FIG. 3 is a diagram schematically showing a storage content of a database of material components.

FIG. 3 exemplifies contents of a data stored in the database of material components 19. In this case, it is indicated that a chemical substance P is contained by ap% by weight and a chemical substance Q is contained by aq% by weight in the material A, and the chemical substance P is contained by bp% by weight and the chemical substance Q is contained by bq% by weight in the material B. Since the data are provided by a material supplier and it is confirmed by the certificate authority 14 that they are the data transmitted from the material supplier, they have high reliability in general.

Regarding the material which the material supplier supplies and contains the first kind assigned chemical substance (hereinafter, referred to as PRTR substance) which is assigned in the PRTR Act, the material supplier transmits the list of a material and PRTR substance contained in the material and the data of the contents of the respective PRTR substances.

Figure 7:
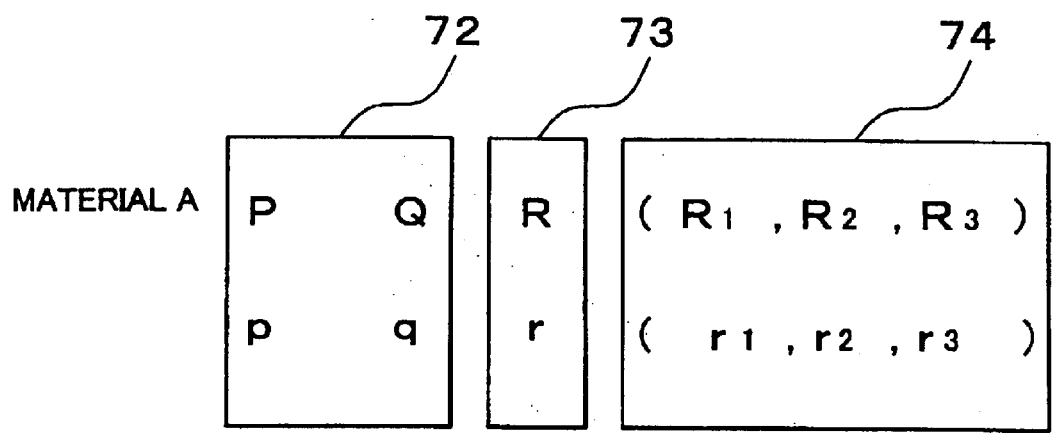
FIG. 7 is a diagram illustrating classification of the utilization range of a material component database.

The material supplier can register chemical substances and their contents by limiting the user. For example, as illustrated in FIG. 7, in the case where chemical substances P, Q, R1, R2, and R3 are contained in material A, the supplier of the material A can utilize information 72 containing the chemical substances P and Q without any limitation, whereas available clients can be specified for data 73 containing chemical substances R and their contents. Further, available clients can be specified for breakdown information 74 on chemical substances R.

At this time, PRTR substances are required to be available for all the clients that uses materials containing PRTR substances. Thus, it is guaranteed that the discharge and transfer amount by every separate whereabouts can be calculated for at least PRTR substances by this computer system.

On the other hand, valuable information is not required to be disclosed to material suppliers unnecessarily. Thus, the material suppliers can provide data reliably, and the database is developed under the cooperation of the material suppliers.

Network released information is direct d to product information on e-commerce and market place information. This information is frequently referred to by the material user, and is expected to be voluntarily registered by the material suppliers. In addition, failure to register at least materials containing PRTR substances in this database causes inconvenience to many users, and the cooperation of the material suppliers can be expected from this point of view.

In this manner, according to this computer system, it is expected that the component database is expanded and developed in a self increment manner.

Figure 6:
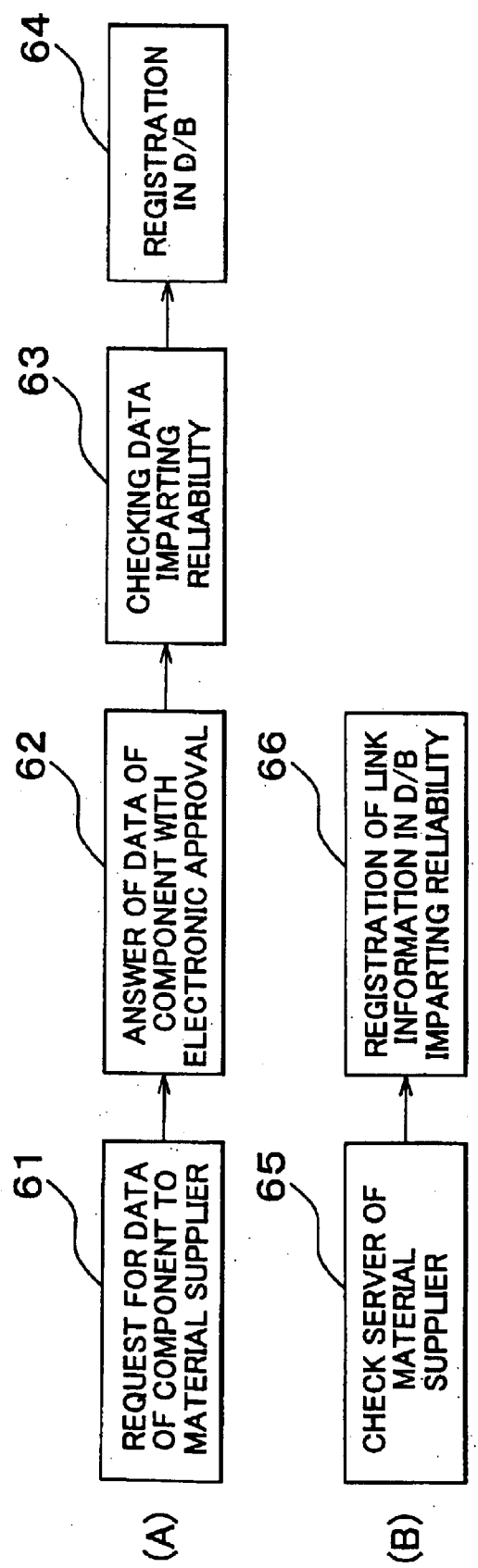
FIG. 6 is a diagram showing a process of providing a database of material component.

FIG. 6 shows a processing procedure related to the provision and maintenance of the database of material components 19. In a processing procedure (A), a practical user of the server for calculating the discharge and transfer amount of chemical substances 16 requests the presentation of component data concerning a material having no data to a material supplier (61), the material supplier requested answers the component data with electronic approval (62), the component data answered are temporarily stored in the input and output section 17, and the practical user of the server for calculating the discharge and transfer amount 16 checks the reliability of the data which was temporarily stored (63), and only the reliable data are registered in the database of material components 19 (64). At this time, an index indicating the reliability is simultaneously registered. In the column of reliability of FIG. 3, it is indicated that 1 is the most reliable data, and 2 is a generally reliable data.

When the material supplier changed the components, there in not the step 61, and it is started from the step 62. At this time, the practical user of the server for calculating the discharge and transfer amount 16 checks new data, and when it is reliable, the storage of the database 19 is rewritten.

As described previously, in this system, it can be expected that the material suppliers voluntarily register data, and in this case as well, processing starts from the step 62.

When the material supplier provides a WEB site and makes the component data of materials available to a third party, the practical user of the server for calculating the discharge and transfer amount 16 accesses the WEB site, checks the reliability of the data (65), and nets a link in the WEB site of the material supplier if it is reliable. Further, an index indicating the reliability is imparted (66). In this case, the link information is stored in the database of material components.

FIG. 4 exemplifies storage contents of a database of a material balance coefficient 20. Firstly, the materials are arranged to a vertical axis direction. The materials are classified according to the category so as to be easily searched, and FIG. 4 exemplifies a part of coatings. The database of a material balance coefficient 20 is constituted by making the chemical substances contained in the material as a unit, and in case of FIG. 4, the discharge and transfer ratio is stored regarding the respective chemical substances P and Q which are contained in the coating having the name of A.

The use steps of materials are arranged to a horizontal axis direction. The use steps are firstly classified into a major classification (for example, casting, forging, body coating, assembly, . . . ), then a middle classification (for example, intermediary coating or over coating in case of body coating), and further, a minor classification (for example, type 1 or type 2 in case of over coating of a body), in order to be easily searched.

That is, the use step in systematically and hierarchically classified so that the client can select the self use step easily. A systematical, hierarchical classification table of the use step is so large that it is difficult to display the table on the client terminal. Thus, classification is actually narrowed in an interactive mode. For example, a major classification list is first displayed on the client terminal, and the user is prompted to make selection from the list. When the client make one selection, a middle classification list that belongs to the above major classification list is displayed, and the user is prompted to make selection from the middle classification list. The client makes selection in interactive mode, whereby the client can select one systematically and hierarchically classified use step.

For example, the rate (q4 of FIG. 4) of waste materials shipped while they adhere to products is determined depending on only the use step, and the discharge step may not be specified.

However, many materials are discharged through any process. In this case, the discharge and transfer rate is not determined unless the discharge step has been specified. Thus, it is required to specify the discharge step. In this case as well, the discharge step is systematically and hierarchically classified so that the client can make selection in accordance with the classification. That is, the classifications of facilities are classified into firstly, the major classification (for example, whether a removal facility is A type or B type in case of over coating of a body of type 1), and then the minor classification (for example, whether a removal efficiency is M or N when the removal facility is A type, and the over coating of a body of type 1 is carried out), In order to be easily searched.

The database of a material balance coefficient of the embodiment is used for collaborate utilization by a group of the business corporations which produce automobiles and groups of parts for the automobiles. When the steps are substantially classified into 5 hierarchies, it is verified that the discharge and transfer ratio which is easily searched by a worker and comparatively exact is obtained.

Figure 8:
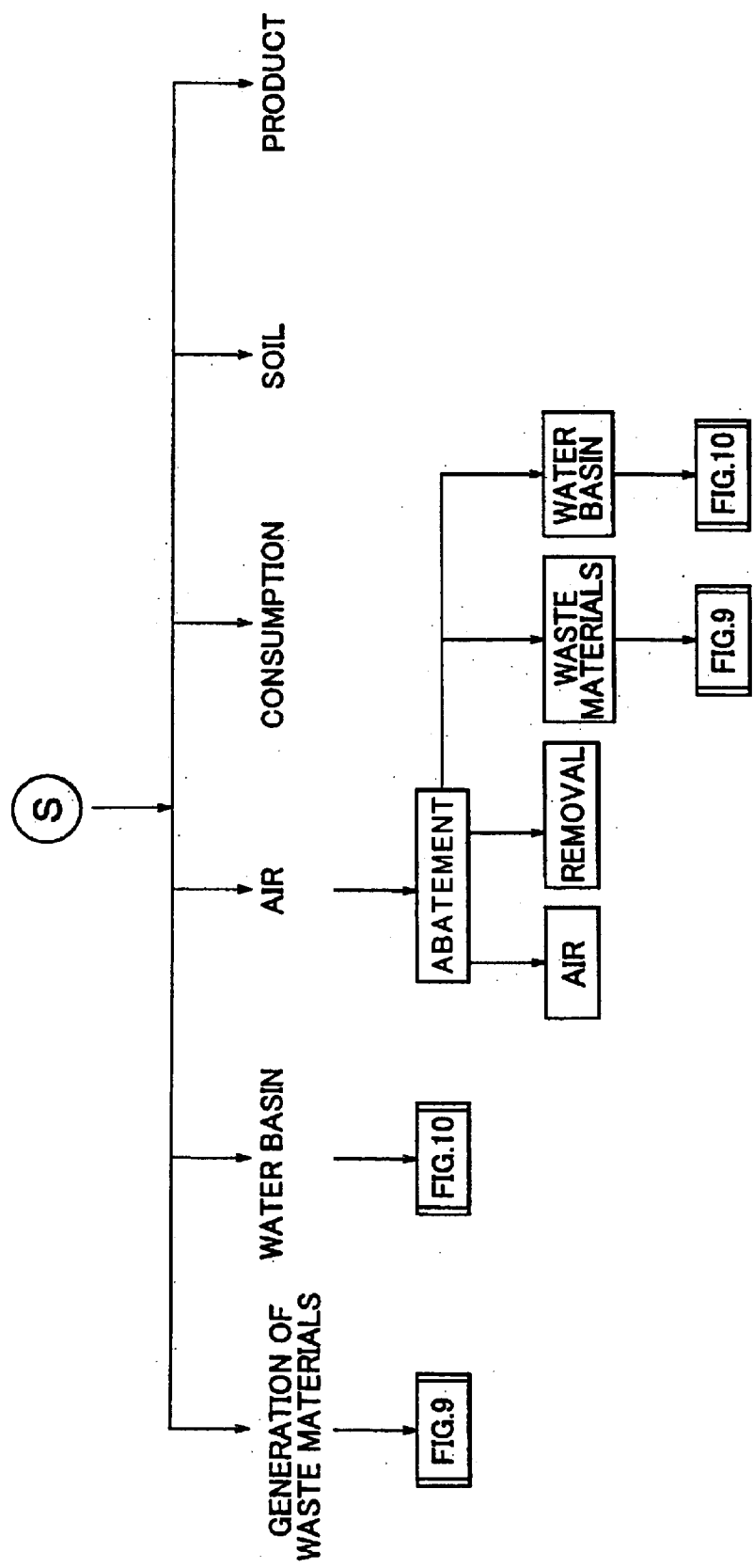

FIG. 8 to FIG. 10 each show a systematical, hierarchical classification employed for assisting a process for the client to narrow the discharge step. As illustrated in FIG. 8, the major classification is determined depending on whether waste materials are produced from the self process, are discharged into a water basin, are discharged in air, are consumed, or are shipped while they adhere to products. In the case where the same materials are discharged and transferred while they are divided into two or more routes, 2 or more classifications can be selected.

For example, in the case where waste materials are produced, as illustrated in FIG. 9, such materials are classified by whether they are recycled, are incinerated, are brought into direct land fill, are brought into in-house land fill, or are brought into outsourcing land fill. Questions for narrowing classification are displayed on the client terminal so that the client can specify the self implemented discharge step selectively by answering these questions. FIG. 10 illustrates detailed classification when waste materials are discharged into a water basin.

The discharge and transfer ratio is imparted by every chemical substance and every use step, and in case of FIG. 4, it is indicated that the chemical substance Q which is contained in the coating having the name of A is transferred by q1% to air, q2% to water basin, q3% to land fill, and q4% to a product which in adhered to the product when the over coating of a body of type 1 is carried out by an A type removal facility having a removal efficiency of N.

The discharge and transfer ratio is a highly reliable ratio which various laboratories studied and decided, and the names of the organizations that decided the ratio are also stored in the database of a material balance coefficient. FIG. 4 shows an example that the ratio which an organization K1 studied and decided is registered in the database.

Figure 5:
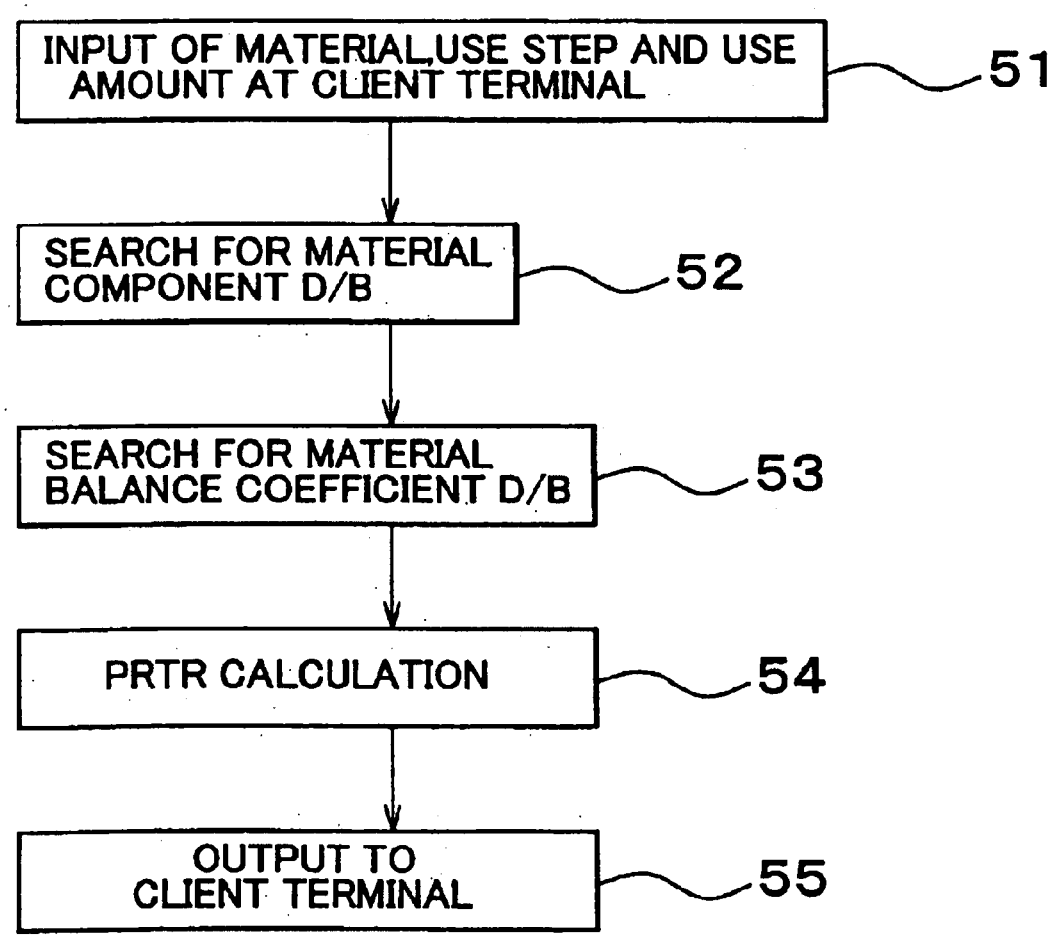
FIG. 5 is a diagram showing a calculation processing procedure of the discharge and transfer amount of the chemical substances by every separate whereabouts.

FIG. 5 shows a processing procedure when the user of a material utilizes the calculation system of the discharge and transfer amount which is collaborate utilization type. The user of a material who wants to calculate the discharge and transfer amount inputs a material which he uses, a use step of the material, and a use amount of the material using the terminal 36 of a client (step 51). The inputted data are temporarily stored in the input and output section 17 of the server for calculating the discharge and transfer amount 16 through the network 40. The storage contents of the database of a material balance coefficient 20 of FIG. 4 is displayed on a client terminal at the time of input at the client terminal 36, and aids the input of the data by the user of a material.

The user of a material inputs the material and the use step (they are classified into 5 hierarchies by materials and processing facilities) with the aid of the indication, and further inputs the use amount.

When the above-mentioned data are stored in the input and output section 17 of the server for calculating the discharge and transfer amount 16, then the search and calculation section 18 starts the processing. Firstly, the database of material components 19 (refer to FIG. 3) which stores the chemical substances contained and the contents is searched corresponding to the material by using the inputted material as a key, and the chemical substances and the contents contained in the material are searched (step 52). Then, the search and calculation section 18 searches for the database 20 (refer to FIG. 3) of a material balance coefficient which stores a ratio in which the chemical substances are discharged and transferred by every separate whereabouts of the chemical substances corresponding to the chemical substance and the use step of the material by using the searched chemical substance and the inputted use step of the material as a key, and searches for the discharge and transfer ratio by every separate whereabouts when the searched chemical substance is used in the inputted use step of the material (step 53). Then, the discharge and transfer amount by every separate whereabouts of the chemical substance is calculated based on the searched discharge and transfer ratio, the inputted use step of the material, and the searched content (step 54). Finally, the discharge and transfer amount by every separate whereabouts of the chemical substance calculated is outputted to the client terminal 36 through the network 40.

For example, when the material used is a coating named as A, and the type 1 in which the use step is the over coating of the body coating is used under the A type removal facility having the efficiency of N, it is grasped that the chemical substance Q is contained by aq% by weight from the database of FIG. 3 and q1% is discharged in air. Accordingly, when A1 g of the coating A is used in the above-mentioned step, it is grasped that A1.aq.q1 g of the chemical substance is discharged in air. In the st p 54 of FIG. 5, the discharge and transfer amount by every separate whereabouts by every chemical substance is calculated (this is called as PRTR calculation, and the calculation result is called as PRTR result).

According to the calculation system, the user of the material is not required to search of the list of the chemical substances contained in the material, and the contents. Further, he is not also required to search the discharge and transfer amount by every separate whereabouts. The highly reliable discharge and transfer amount can be calculated by every separate whereabouts without searching these data by himself.

The client can print out in document format the discharge and transfer amount by every separate whereabouts of the calculated chemical substances. For example, chemical substance names discharged on a vertical axis are listed on the vertical axis, and the documents can be obtained in which the discharge and transfer amounts by every separate whereabouts are listed in the horizontal direction.

At this time, in-house land fill and outsourcing land fill can be intensively carried out arbitrarily, and chemical substances that belong to aromatic fatty acid can be intensively handled as aromatic fatty acid.

The client can make adjustment to documents according to intended use.

The server for calculating the discharge and transfer amount of chemical substances 16 which really carries out the above-mentioned calculation processing has the means 17 for inputting and storing the data which indicates the material, the use step of the material, and the use amount of the material; the database of material components 19 of storing the chemical substances contained and the contents corresponding to the material, the means 18 for searching for the database of material components using the inputted material, and searching for the chemical substance contained in the material and the content; the database of a material balance coefficient 20 which stores a ratio in which the chemical substance are discharged and transferred by every separate whereabouts of the chemical substance such as air, water basin, a product and the like corresponding to the chemical substance and the use step of the material; the means 18 for searching for the database of a material balance coefficient using the searched chemical substance and the inputted use step of the material as a key, and searching for the discharge and transfer ratio by every separate whereabouts when the searched chemical substance is used in the inputted use step of the material; the means 18 for calculating the discharge and transfer amount of the chemical substances by every separate whereabouts based on the searched discharge and transfer ratio, the inputted use amount of the material and the searched content; and the means 17 for outputting the calculated discharge and transfer amount by every separate whereabouts of the calculated chemical substance.

The practical user of the server for calculating the discharge and transfer amount 16 appropriately checks the storage contents of the database of material components 19 and the database of a material balance coefficient 20, and when abnormal data are stored, it is repaired to the normal data by receiving normal data.

The list of the first kind assigned chemical substance assigned by the PRTR Act is stored in the PRTR database of FIG. 2. Besides, an additional scheduled substance can be also stored in the chemical substance which the user of a material wants to calculate the discharge and transfer amount by every separate whereabouts, and the first kind assigned chemical substance. The database of material components 19 and the database of a material balance coefficient 20 are provided and supplemented for the material which contains the chemical substance stored in the PRTR database, and the chemical substance stored in the PRTR database 22.

The server for calculating the discharge and transfer amount of chemical substances 16 is equipped with the file 24 which stores the use carrier of the calculation service by every separate client, calculates an equivalent for using the calculation service, based on the storage, and carries out a processing of requesting the calculated equivalent to a client. Further, it has also a processing part carrying out the electronic settlement of the equivalent between the client terminal 36.

Since the discharge and transfer amount of chemical substances by every separate whereabouts which needs many data in the process of calculation can be calculated by the server and the system constructed by the server, only by inputting the data which the user of a material can immediately know, they have extremely high value to be used. In particular, when the technology is used for the PRTR substance, it is made possible to achieve the duty which the law imparts to the business corporation in a short time at a low load, and accurately.

What is claimed is:

1. A calculation method of a discharge and transfer amount of chemical substances, comprising:
   a step of inputting and storing a data which indicates a material, a use step of the material and a use amount of the material which are transmitted from a client terminal through a network;
   a step of searching a database of material components storing a contained chemical substance and content thereof corresponding to the material by using the inputted material as a key, and searching for the chemical substance contained in the material and the content;
   a step of searching a database of a material balance coefficient which stores a ratio in which the chemical substance is discharged and transferred by every separate whereabouts of the chemical substance including at least one of air, water basin, and a product corresponding to the chemical substance and the use step of the material by using the searched chemical substance and the inputted use step of the material as a key, and searching for the discharge and transfer ratio by every separate whereabouts when the searched chemical substance is used in the inputted use step of the material;
   a step of calculating the discharge and transfer amount of the chemical substances by every separate whereabouts based on the searched discharge and transfer amount, the inputted use amount of the material, and the searched contents; and
   a step of transmitting the calculated discharge and transfer amount by every separate whereabouts of the searched chemical substance to a client terminal through a network.

2. A method of calculating a discharge and transfer amount of chemical substances, comprising:
   a step of inputting and storing data indicating materials, a material use step, a material use amount, and a discharge step which are transmitted from a client terminal through a network;
   a step of searching a material component database that stores contained chemical substances and contents in association with the substance by defining the inputted material as a key, and then, searching the chemical substances contained in the material and contents;
   a step of searching a material balance coefficient database that stores a rate of which chemical substances are discharged and transferred by every separate whereabouts of the chemical substances including at least one of air and products in association with the chemical substances, material use step, and discharge step by defining as a key the searched chemical substances, inputted material use step, and discharge step, and then, searching a discharge and transfer rate by every separate whereabouts when the searched chemical substances are discharged at the discharge step used and inputted at the inputted material use step;
   a step of calculating the discharge and transfer amount by every separate whereabouts of chemical substances based on the searched discharge and transfer rate, inputted material use amount, and searched contents; and
   a step of transferring the discharge and transfer amount by every separate whereabouts of the calculated chemical substances to the client terminal through a network.

3. A method of calculating a discharge and transfer amount of chemical substances, comprising:
   a step of server inputting and storing data indicating materials, a material use step, a material use amount, and a discharge step which are transmitted from a client terminal through a network;
   a step of server searching a material component database that stores contained chemical substances and contents in association with the substance by defining the inputted material as a key, and then, searching the chemical substances contained in the material and contents;
   a step of server searching a material balance coefficient database that stores a rate of which chemical substances are discharged and transferred by every separate whereabouts of the chemical substances including at least one of air and products in association with the chemical substances, material use step, and discharge step by defining as a key the searched chemical substances, inputted material use step, and discharge step, and then, searching a discharge and transfer rate by every separate whereabouts when the searched chemical substances are discharged at the discharge step used and inputted at the inputted material use step;
   a step of server calculating the discharge and transfer amount by every separate whereabouts of chemical substances based on the searched discharge and transfer rate, inputted material use amount, and searched contents; and
   a step of server transferring the discharge and transfer amount by every separate whereabouts of the calculated chemical substances to the client terminal through a network.

4. A method of calculating a discharge and transfer amount of chemical substances for a client, comprising:
   a stage of displaying a material list classified by material categories to the client terminal, and then, prompting the client to input the use material and material use amount;

a stage of displaying a hierarchically classified material use step list on the client terminal, and then, prompting the client to input the material use step;

a stage of displaying a hierarchically classified discharge step list on the client terminal, and then, prompting the client to input the discharge step; and a stage of inputting to the server the use material, material use amount, and material use step, and discharge step inputted from the client terminal, calculating the discharge amount by every separate whereabouts of the chemical substances contained in the use material by the server, and then, outputting the amount to the client terminal.

5. A server for calculating a discharge and transfer amount of chemical substances comprising:

means for inputting and storing a data indicating and storing a material, a use step of the material, and a use amount of the material;

a database of a material component storing a chemical substance contained and a content corresponding to the material;

means for searching for the database of the material component using the inputted material as a key, and searching for the chemical substance and the content contained in the material;

a database of a material balance coefficient which stores a ratio in which the chemical substance is discharged and transferred by every separate whereabouts of the chemical substance including at least one of air, water basin, and a product corresponding to the chemical substance and the use step of the material;

means for searching for the database of a material balance coefficient using the searched chemical substance and the inputted use step of the material as a key, and searching for the discharge and transfer ratio by every separate whereabouts when the searched chemical substance is used in the inputted use step of the material;

means for calculating the discharge and transfer amount of the chemical substances by every separate whereabouts based on the searched discharge and transfer ratio, the inputted use amount of the material and the searched content; and means for outputting the calculated discharge and transfer amount by every separate whereabouts of the chemical substances.

6. A server for calculating a discharge and transfer amount of chemical substances, comprising:

means for inputting and storing data indicating a material, a material use step, a material use amount, and a discharge step;

a material component database that stores contained chemical substances and contents in association with an inputted material;

means for searching the material component database by defining the inputted material as a key, and then, searching the chemical substances contained in the material and the contents;

a material balance coefficient database that stores a rate of which the chemical substances are discharged and transferred by every separate whereabouts of the chemical substances including at least one of air, water basin, and a product in association with the chemical substances, material use step, and discharge step;

means for searching the material balance coefficient database by defining the searched chemical substances, inputted material use step, and discharge step as a key, and then, searching the discharge and transfer rate by every separate whereabouts when the searched chemical substances are discharged at the discharge step used and inputted at the inputted material use step;

means for calculating the discharge and transfer amount by every separate whereabouts of the chemical substances based on the searched discharge and transfer rate, inputted material use amount, and searched contents; and means for outputting the discharge and transfer amount by every separate whereabouts of the calculated chemical substances.

7. A computer system in which client terminals are connected to a server for calculating a discharge and transfer amount of chemical substances through a network, said computer system comprising:

a client terminal prompting a client to input data indicating a material, a material use step, a material use amount, and a discharge step in interactive mode; and a server for calculating a discharge and transfer amount of chemical substances, the server calculating the discharge and transfer amount by every separate whereabouts of chemical substances, and transmitting the calculation result to the client terminal by employing a material component database that stores contained chemical substances and their contents in association with materials and a material balance coefficient database that stores a rate of which the chemical substances are discharged and transferred by every separate whereabouts of the chemical substances including at least one of air, water basin, and a product in association with the chemical substances, material use step, and discharge step.

8. A computer system of claim 7, wherein a material supplier server is connected to a network, and a material component database is updated based on data transmitted from the material supplier server.

9. A computer system of claim 7, wherein a material supplier server is connected to a network, an operator of the server for calculating the discharge and transfer amount of chemical substances checks data transmitted from the material supplier server, and the material component database is updated based on the checked data.

10. A computer system of claim 7, wherein the material supplier server is connected to a network, and a material component database stores link information indicating an address of the component information of each material that exists in the material supplier server.

11. A computer system of claim 7, wherein a client terminal capable of browsing a material component database has restricted access based on type of material.

12. A computer system of claim 7, wherein a client terminal has a function for printing out in a document format a discharge and transfer amount by every separate whereabouts of chemical substances transmitted from the server for calculating a discharge and transfer amount of chemical substances.

13. A computer system of claim 12, wherein the client terminal has a function for printing out in an intensive document format a discharge and transfer amount by every separate whereabouts of chemical substances transmitted from the server for calculating a discharge and transfer amount of chemical substances.

* * * * *